United States Patent [15] 3,702,002
Taylor et al. [45] Oct. 31, 1972

[54] OSCILLOGRAPH RECORDER TRACE BLANKER APPARATUS

[72] Inventors: Richard R. Taylor; Frank A. MacKay, both of Riverside, Calif.

[73] Assignee: The United States of America as represented by the Secretary of the Navy

[22] Filed: Nov. 24, 1971

[21] Appl. No.: 201,694

[52] U.S. Cl. .................................................. 346/109
[51] Int. Cl. ........................................... G01d 15/14
[58] Field of Search ........................ 346/109; 324/97

[56] References Cited

UNITED STATES PATENTS

| 2,467,950 | 4/1949 | Thompson | 346/109 X |
| 2,946,643 | 7/1960 | Hutchison et al. | 346/109 X |
| 3,374,485 | 3/1968 | Gemmer | 346/23 |
| 3,422,444 | 1/1969 | Stauffer | 346/109 |

Primary Examiner—Joseph W. Hartary
Attorney—R. S. Sciascia et al.

[57] ABSTRACT

Electromechanical apparatus for blanking galvanometer traces and which can be used to advantage in high-speed computer data systems which include multi-channel oscilloscope recorders. A galvanometer is positioned symmetrically between two non-magnetic flat plates which are parallel to the galvanometer reference beam. The two plates are spaced apart a distance sufficient to allow the galvanometer reference beam to be deflected a selectively predetermined amount in each direction from the center of the galvanometer during unblanked operation. During blanked operation, electrical circuitry, which can be actuated locally or remotely, removes normal excitation from the galvanometer and energizes its with a blanking signal which deflects the reference beam onto one of the two plates to block it or shield it from the oscillograph recorder.

4 Claims, 3 Drawing Figures

PATENTED OCT 31 1972 3,702,002

INVENTOR.
RICHARD R. TAYLOR
FRANK A. MACKAY
BY

INVENTOR.
RICHARD R. TAYLOR
FRANK A. MACKAY
BY

OSCILLOGRAPH RECORDER TRACE BLANKER APPARATUS

BACKGROUND OF THE INVENTION

Currently, oscillograph recorders have multi-channel data recording capabilities in the order of 50 or more channels. Obviously, it is impractical and unwise to use that many channels in most applications since that much data can not be recorded effectively on conventional 12-inch recording paper. Consequently only the channels actually required should be utilized in any given application and the others should be unblanked. The present invention comprises novel galvanometer blanking apparatus which can be manually or automatically controlled as by a computer to select only those channels whose output is desired to be recorded simultaneously and to blank out all the other channels.

SUMMARY OF THE INVENTION

A galvanometer trace blanker for multi-channel oscillograph recorders and for use in automatic, computer-controlled systems is disclosed. The apparatus comprises a mechanical light shield for the galvanometer reference beam and a deflected beam position controller. The light shield includes a plurality of non-magnetic, flat plates which are positioned and supported upon a common base member in a parallel relationship with respect to each other. Each galvanometer is symmetrically positioned between two adjacent plates which are parallel to the galvanometer reference beam. The deflected beam position controller, in response to local or automatic actuation, energizes every galvanometer to be blanked to thereby position the deflected beam behind the light shield to block it from the recording device. The blanking excitation is removed by local or automatic excitation of the deflected beam position controller to return the galvanometer to unblanked operation.

OBJECTS OF THE INVENTION

The primary object of the present inventive concept is to advance the state-of-the-art of galvanometer trace blanking circuits by disclosing an electromechanical blanking circuit which is compatible with high-speed computer data systems.

Other objects, advantages and novel features of the invention will become apparent from the following detailed description of the invention when considered in conjunction with the accompanying drawings.

DESCRIPTION OF THE PREFERRED EMBODIMENT

Figure 1:
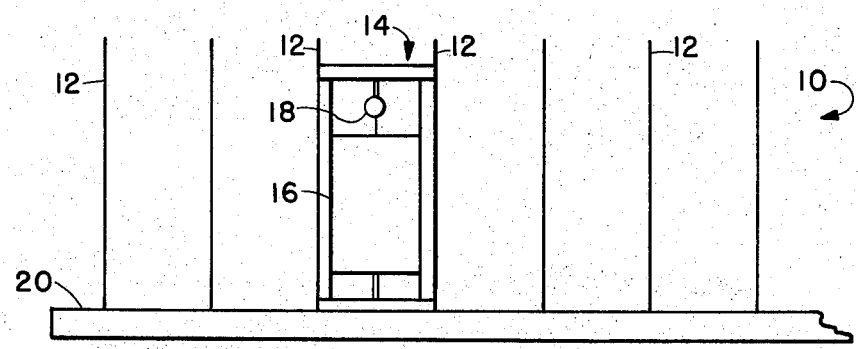
FIG. 1 represents a front view of the preferred embodiment of the novel galvanometer trace blanking apparatus which embraces the present inventive concept.

FIG. 1 represents a front view of the mechanical unit 10 of the electromechanical galvanometer trace blanking circuit to be disclosed herein. The unit 10 comprises a plurality of non-magnetic flat plates 12 which are positioned in a parallel manner with respect to each other and which are supported upon a common base member 20.

It should be appreciated that although only seven plates are shown in FIG. 1, as many plates as desired could be used within the scope of the inventive concept.

A galvanometer 14 which is shown in simplified form is positioned symmetrically between each pair of adjacent plates which are preferably black. Only one galvanometer is thus illustrated to simplify the description of the blanking device since the description would be identical for any other channel comprising two adjacent plates and a galvanometer positioned between the two plates.

The galvanometer 14 comprises a conventional galvanometer which for purposes of illustration is shown in simplified form as consisting of a coil 16 having a rotatable mirror 18 mounted thereon.

Figure 2:
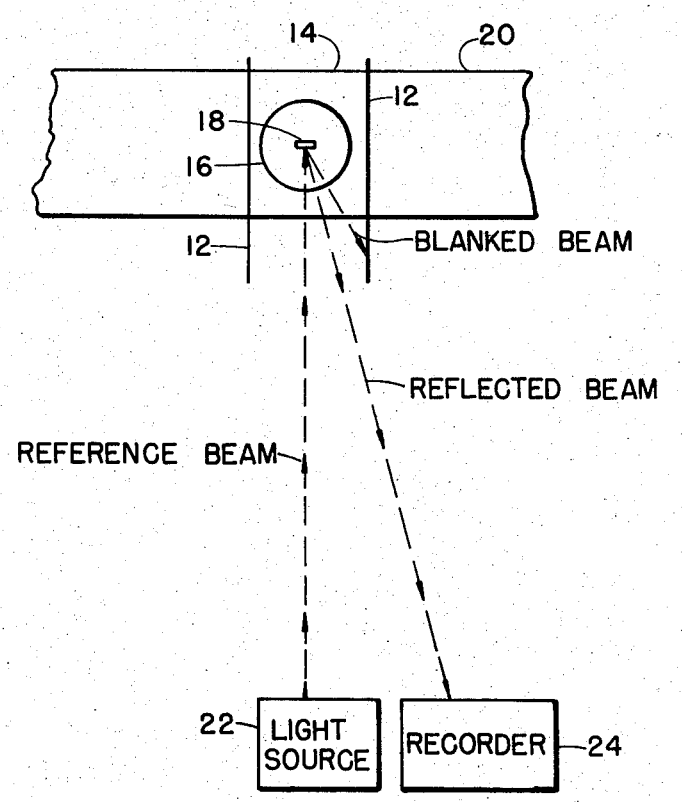
FIG. 2 represents a top view of one data channel of the apparatus of FIG. 1; and, FIG. 3 represents a simplified electrical schematic of the galvanometer deflected beam position controller of the novel apparatus disclosed herein.

FIG. 2 represents a top view of the galvanometer 14 and its two corresponding plates. As can be seen, the galvanometer 14 is positioned symmetrically between the two plates 12 which are parallel to the incoming galvanometer reference beam from the light source 22.

In normal, unblanked galvanometer operation, the reference beam is focused upon the mirror 18 which is attached above the coil 16. The coil is excited by a signal whose magnitude is to be measured to thereby create a magnetic field about the coil which interacts with a permanent magnetic field in the galvanometer. The interaction causes the coil to rotate an amount proportional to the strength of the signal.

The impinging reference beam is thereby reflected from the mirror 18 an angular amount equal to the rotation of the coil. The beam is reflected from the mirror onto a scale or recorder 24 which is a distance away. As the mirror turns, the reflected beam travels across the scale or recording paper in the oscillograph recorder 24.

It is apparent from an examination of FIG. 2, that the reflected beam will not be reflected towards the recorder if the coil rotates an amount sufficient to reflect the beam at either plate 12 which thereby function as light shields to block the beam from reaching the recorder 24.

When this condition occurs, the galvanometer 14 trace is effectively blanked. Thus, any selectively predetermined number of galvanometers can be blanked or unblanked in a multi-channel oscillograph recorder as required by a particular application.

Figure 3:
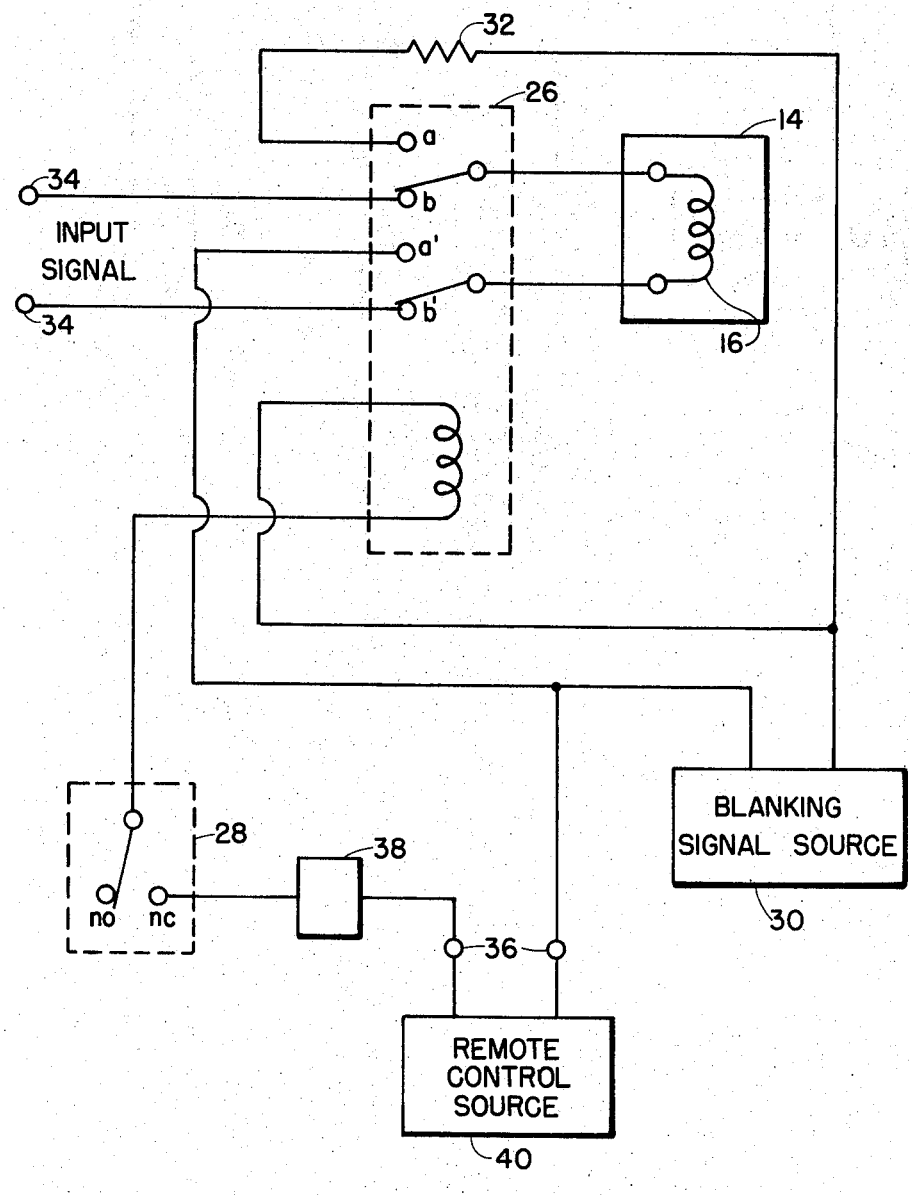

The electrical circuit shown in simplified form in FIG. 3 can be used to accomplish the above coil movement and subsequent galvanometer blanking. The circuit essentially comprises a double-pole, double-throw relay 26, a single-pole switch 28, a DC power supply 30, and a resistor 32. It should be understood that such a circuit would be used for each galvanometer although only one is shown.

In unblanked operation, an input signal is applied to the input terminals 34. The relay 26 is energized so that, as shown in FIG. 3, the input signal is coupled directly to the galvanometer coil 16 through the contacts $b-b'$ as previously indicated.

The switch 28 is closed whereby the indicator lamp 38 indicates whether the galvanometer is unblanked or blanked. The unblanked circuit is completed by the remote control source 40 through the terminals 36. If local control is used, the terminals 36 are shorted.

In blanked operation, the relay circuit 26 is opened by a signal from the remote control source 40 or by opening switch 28 if local control is used. The relay coil is thereby de-energized and the contacts are switched to the $a-a'$ position of FIG. 3.

In this condition, the galvanometer coil 16 receives its energization from the DC power supply 30 through the resistor 32. The magnitude of the blanking signal can be selectively adjusted to reflect the reference beam into the blanking plates or light shields 12 as discussed above. The value of the resistor 32 is selected in accordance with the particular type of galvanometer being used.

Thus it can be seen that a new and novel blanking circuit for galvanometers and oscillograph recorders has been disclosed. Obviously many modifications and variations of the present invention are possible in the light of the above teachings. It is therefore to be understood that within the scope of the appended claims the invention may be practiced otherwise than as specifically described.

What is claimed is:

1. In galvanometer devices wherein a rotatable coil is deflected an amount proportional to the strength of a signal being measured and wherein a mirror is fastened rigidly to said coil to thereby reflect a reference beam onto a recording device to measure said strength, apparatus for blanking the reflected beam from said recording device comprising:
    light shield means consisting of two non-magnetic, flat plates disposed and supported upon a common base member;
    said galvanometer device being disposed and supported between said two plates and said reference beam being parallel to said two plates;
    said two plates being spaced apart a selectively predetermined distance whereby said reference beam can be reflected between said two plates over a selectively predetermined deflection range;
    first switch means for applying said signal being measured to said galvanometer device during unblanked operation;
    a DC blanking voltage source;
    second switch means for removing said signal from said galvanometer device and for simultaneously applying a DC blanking voltage from said source thereto to reflect said reference beam onto one of said two plates.

2. The apparatus of claim 1 further including means for indicating whether said galvanometer device is unblanked or blanked.

3. The apparatus of claim 1 wherein said second switch means includes control means responsive to general-purpose computer commands.

4. In an oscillograph recorder having a plurality of galvanometers wherein a reference beam is reflected onto said recorder as a signal trace, apparatus for automatically blanking any of said galvanometers comprising:
    light shield means consisting of a plurality of non-magnetic, flat plates positioned in a parallel manner and spaced apart a selectively predetermined distance with respect to each and supported upon a common base member;
    each of said galvanometers being positioned symmetrically between two adjacent plates;
    said two plates being positioned in a parallel manner with respect to said reference beams;
    first switch means for coupling signals to be measured to said galvanometer;
    second switch means for removing said signals from said galvanometer and for simultaneously coupling a DC voltage thereto to thereby reflect said reference beam onto one of said plates and thereby block it from reaching said recorder.

* * * * *